C. F. FALLINE.
TROLLEY WHEEL GUIDE.
APPLICATION FILED OCT. 1, 1920.
1,365,821.
Patented Jan. 18, 1921.
3 SHEETS—SHEET 1.
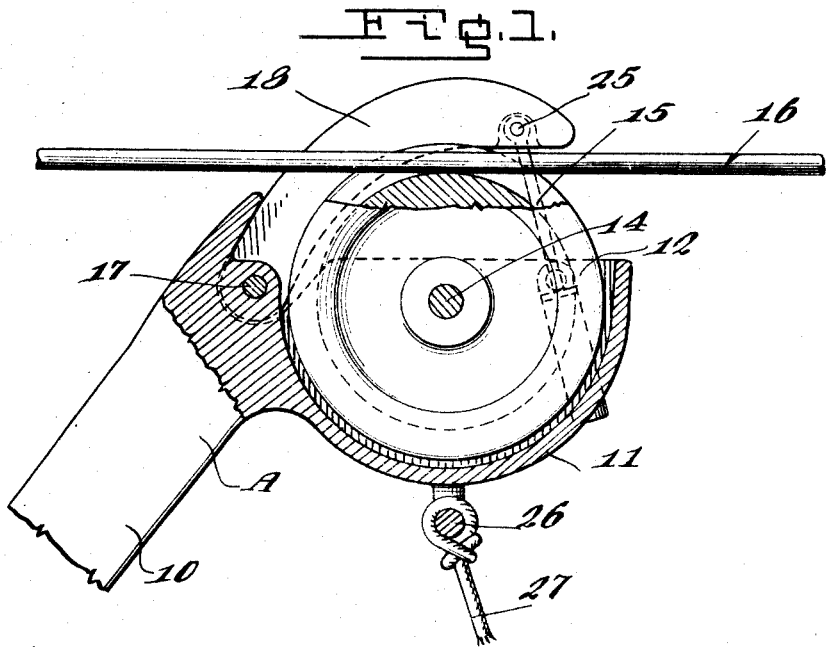
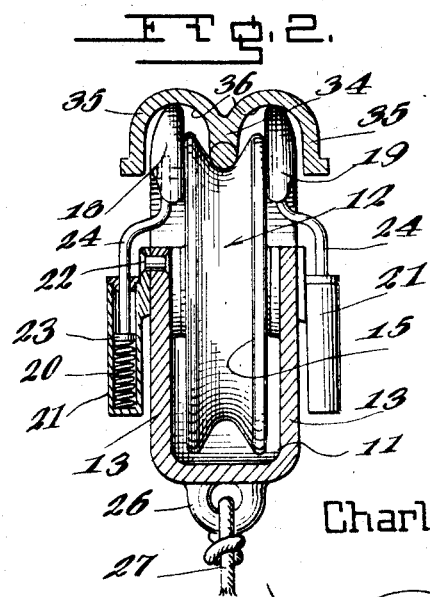
Charles F. Falline
Inventor C. F. FALLINE.
TROLLEY WHEEL GUIDE.
APPLICATION FILED OCT. 1, 1920.
1,365,821.
Patented Jan. 18, 1921.
3 SHEETS—SHEET 2.
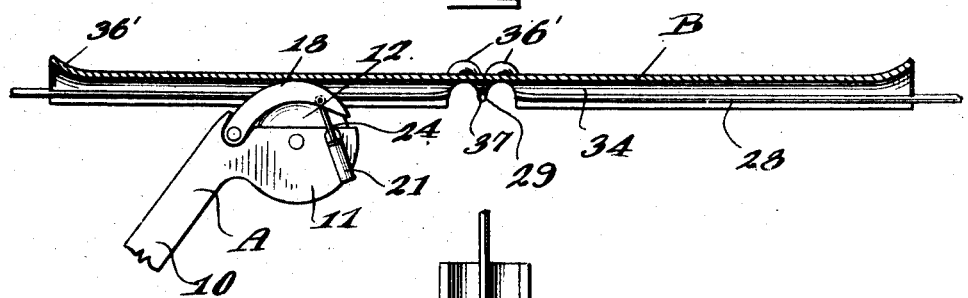
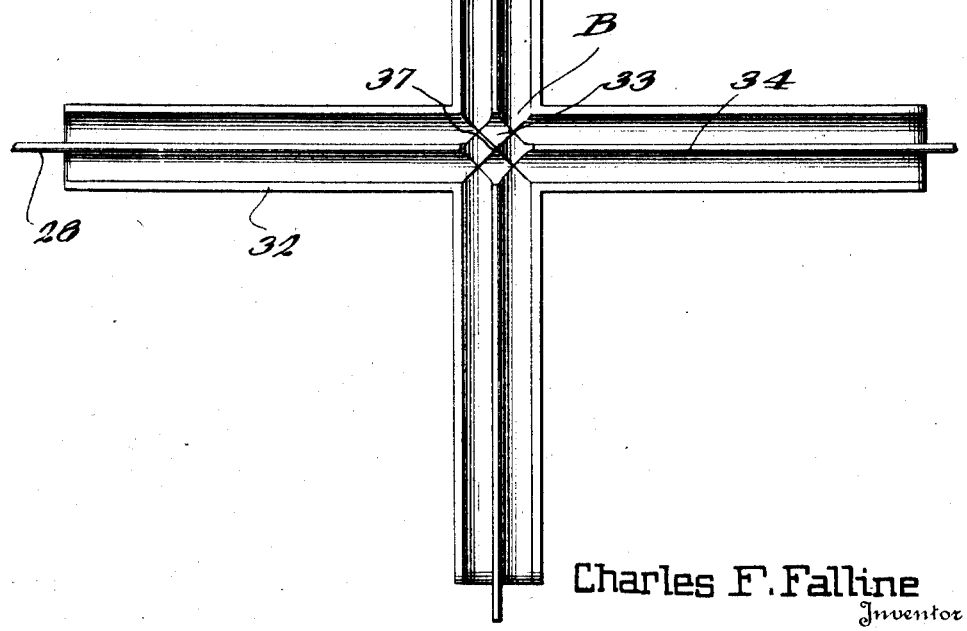
Charles F. Falline
Inventor

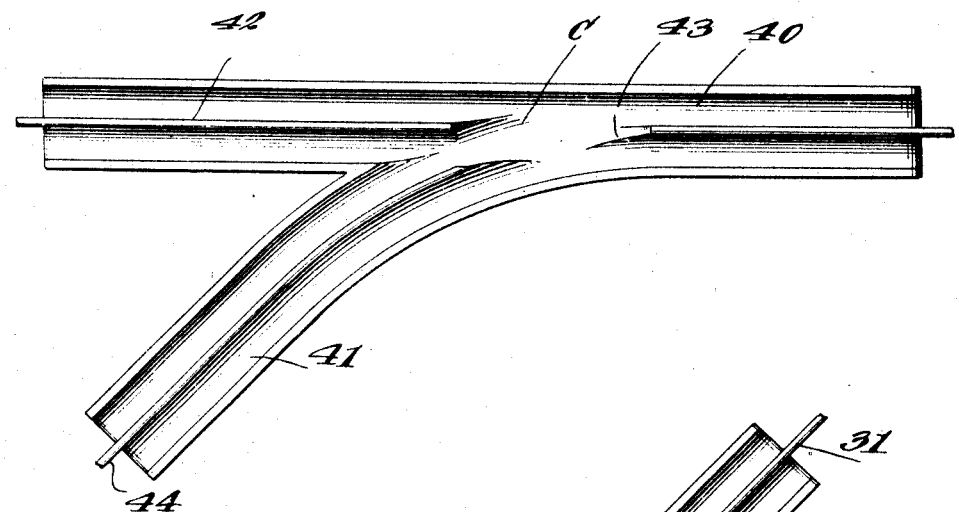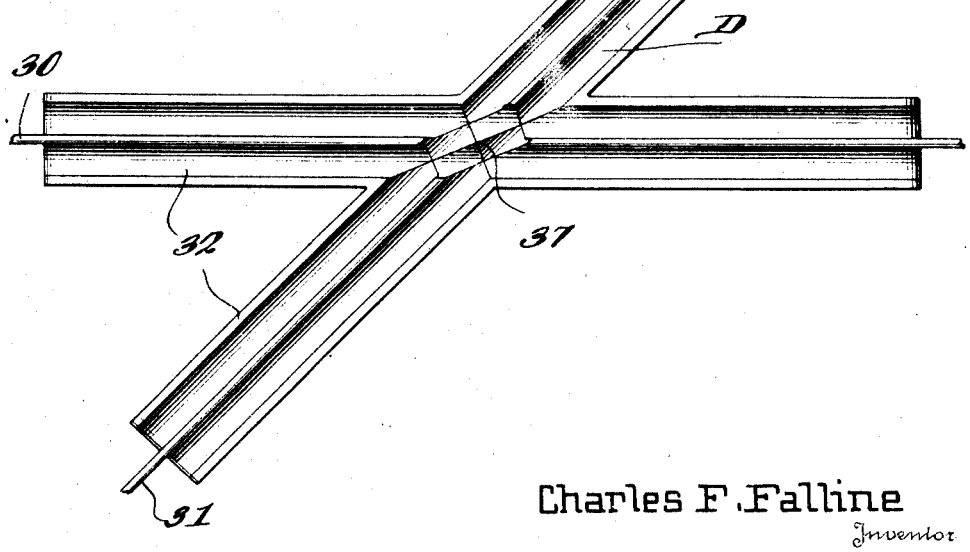

UNITED STATES PATENT OFFICE.

CHARLES F. FALLINE, OF ATLANTA, GEORGIA.

TROLLEY-WHEEL GUIDE.

1,365,821.  Specification of Letters Patent.  Patented Jan. 18, 1921.

Application filed October 1, 1920. Serial No. 413,981.

*To all whom it may concern:*

Be it known that I, CHARLES F. FALLINE, a citizen of the United States, residing at Atlanta, in the county of Fulton and State of Georgia, have invented certain new and useful Improvements in Trolley-Wheel Guides, of which the following is a specification.

This invention relates to electric railways and the primary object of the invention is to provide an improved means for effectively preventing the trolley wheel from jumping the conductor wire when the car is in motion, thereby eliminating the inconveniences and loss of time generally caused thereby.

Another object of the invention is to provide an improved type of trolley wheel and an improved type of trolley wire crossing and switch for coöperation therewith, the trolley wheel and crossing and switch being so constructed in relation to each other that the wheel is absolutely precluded from jumping the wire at the crossing and switch and permits the continuation of the feeding of the current to the wheel at the crossing or switch.

A further object of the invention is to provide an improved trolley wheel harp embodying an improved support for the trolley wheel and an improved type of guard fingers for the wheel, the guard fingers being of novel construction and arranged on opposite sides of the trolley wheel for preventing the displacement thereof from the trolley wire, the guard fingers being normally held in a raised position and of such construction as to engage the guards carried by the trolley wires at the crossings or switches of the trolley wires.

A further object of the invention is to provide an improved type of guard for the wires at crossings and switches thereof which includes the depending flanges arranged at opposite sides of the wires forming tracks or housings for the guard fingers carried by the trolley wheel.

A still further object of the invention is to provide an improved guide for trolley wheels of the above character, which will be durable and efficient in use, simple and easy to manufacture, and one which can be manufactured and incorporated with a railway system at a minimum cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a fragmentary view of the upper end of a trolley pole, the head or harp thereof being shown in vertical section and illustrating the manner of engagement of the trolley wheel with the trolley wire.

Fig. 2 is a vertical transverse section through the trolley harp and trolley wire and guard therefor.

Fig. 3 is a vertical longitudinal section through the guard provided for the trolley wheel at the crossing of the trolley wires and illustrating the engagement of the trolley harp therewith, the trolley harp being shown in side elevation.

Fig. 4 is a bottom plan view of the guide provided at the crossing of the trolley wires.

Fig. 5 is a bottom plan view of the guard provided at the switch points for the trolley wires, and Fig. 6 is a bottom plan view of the guards for the trolley wheel at crossings where the trolley wires cross each other at acute angles.

Referring to the drawings in detail, wherein similar reference characters designate like and corresponding parts throughout the several views, the letter A indicates the improved trolley harp, B the guard for the trolley wires at the crossings thereof when the wires cross at right angles, C the guard for the trolley wires at the switch points thereof, and D, the guards for the trolley wires when the same cross each other at acute angles.

The improved trolley harp A is carried by a pole 10 of any preferred construction, and includes a substantially semi-circular housing 11, in which the trolley wheel 12 is mounted. The semi-circular housing 11 includes the semi-circular side walls 13 and the upper ends of these walls carry suitable bearings for the shaft 14 for the trolley wheel 12. The wheel 12 is constructed in the usual manner and has its periphery grooved as at 15 for the reception of the trolley wire designated by the numeral 16. The semi-cylindrical housing or casing 11 projects rearwardly from the trolley harp A and the harp has pivotally secured thereto by means of pivot pins 17 the rearwardly extending arcuate guard arms 18 and 19. These guard arms 18 and 19 extend on opposite sides of the trolley wheel 12 and are arranged to normally project above the upper surface of the same. The outer surface of the guard fingers 18 and 19 are curved transversely so as to permit the convenient engagement with the guards B and D of the crossings and the guards C for the switches. These guard fingers or arms 18 and 19 are normally held in their raised positions by means of expansion coil springs 20 which are confined within cylinders 21 which are hingedly secured by means of the pivot pins 22 at their upper ends to the opposite side walls 13 of the semi-cylindrical casing 11. These cylinders 21 receive the plungers 23 which bear against the upper surface of the coil springs 20 and these plungers carry upwardly extending rods 24 which curve inwardly toward the guard fingers. The upper ends of these rods 24 are connected to the guard fingers by means of pivot pins 25. By this arrangement, it can be seen that an effective device is provided for holding the guard fingers 18 and 19 in their raised position and for permitting the guard fingers to be depressed for engaging the guards for the crossings and switches. The lower surface of the casing 11 may be provided with an eye 26, to which may be attached the cable 27 by means of which the harp may be raised or lowered.
By referring to Figs. 4 and 6, it can be seen that the guards for the crossings B and D are constructed identically the same with the exception that the wire 28 of the crossing B crosses the wire 29 at right angles, while the wire 30 of the crossing D crosses the wire 31 at an acute angle. Inasmuch as these crossings are constructed the same, a description of one is deemed sufficient for both.
It can be seen that in these crossings, the guards B and D include a plurality of radiating arms 32, which unite at a common center designated by the numeral 33. Each of the arms includes a longitudinally centrally disposed flange 34, to which the conductor wire is secured. The conductor wires of the arms 32, terminate short of the common center 33, so as to permit the convenient riding of the trolley wheel 12 past this point. On each side of the centrally disposed flange 34 are outwardly and downwardly extending guard flanges 35, and these flanges 35 extend below the surface of the central flange 34 and define with the central flange 34, guide tracks 36, in which the guard fingers or arms 18 and 19 are adapted to ride. The central point of connection of the arms 32 is provided with a centrally disposed depending lug 37, which is in direct alinement with the depending flanges 34 of each of the arms 32. The outer ends of the arms are preferably flared upwardly and outwardly as at 36′ which forms efficient means for guiding the guard fingers or arms 18 and 19 into the tracks.

By providing these tracks and by so shaping the guard fingers the jumping of the trolley wheel from off of its wire is absolutely precluded and it will be seen that the guards form an effective means for guiding the trolley wheel over a trolley crossing or the like.

In operation of the improved trolley wheel and guide therefor, it can be seen that the guard fingers or arms 18 and 19 will be held normally above the trolley wheel and on opposite sides of the trolley wheel so as to normally tend to centralize the trolley wheel in relation to the wire and when the trolley wheel engages one of the guards at the crossings it can be seen that the guard fingers will be depressed and will ride in the tracks 36 which will effectively hold the wheel on the wire and against jumping. The length of the fingers 18 and 19 is such as to practically bridge the distance between the wires at the crossings so that the jumping of the wheels at this point is also absolutely precluded and as a central point 37 is provided between the radially extending arms, the same further tends to safeguard trolley wheels at this point. The guard switch C is constructed practically the same as the guards for the crossings B and D inasmuch as the cross section configuration of these guards is the same as the crossing guards.

By referring to Fig. 5 it can be seen that a central guard 40 is provided for the main line wire and a guard 41 provided for the branch wire. The guard 40 has the wire thereof 42 cut at the juncture of the branch guard 41 therewith as indicated by the numeral 43. The wire 44 of the branch guard 41 also terminates short of the wire 42. The guard fingers of the trolley wheel coöperate with the switches in the same manner as they coöperate with the guards for the crossings B and D.

From the foregoing description it can be seen that an improved means has been provided for effectively preventing the jumping of a trolley wheel from the trolley wire under all conditions.

Changes in details may be made without departing from the spirit or scope of this invention; but,

I claim:

1. In a guide for trolley harps, the combination with crossing and branching conductor wires having a guard plate provided with a central flange for the wires, and guard flanges on opposite sides of the wire, of a trolley wheel for engagement with the wires and guard fingers arranged on opposite sides of the wheel for engagement with the guard flanges.

2. In a guide for trolley harps, the combination with crossing and branching wires having a guard plate provided with a central flange for the wires, and guard flanges on opposite sides of the central flange, of a trolley wheel for engagement with the central flange, hinged guard fingers arranged on opposite sides of the trolley wheel, and spring means for normally urging the guard fingers into engagement with the guard flanges.

3. In a guide for trolley harps, the combination with crossing or branching conductor wires having a guard plate provided with a central flange for the wires, and outwardly and downwardly extending semicircular guard flanges arranged on opposite sides of the wires, of a trolley wheel arranged to engage the wires, arcuately curved guide fingers hingedly mounted on opposite sides of the trolley wheel, spring means normally urging the fingers in a raised position for engagement with the guard flanges, the outer surfaces of the guard fingers being curved to conform to the cross sectional configuration of the guard flanges.

4. In a guide for trolley harps, the combination with a trolley wheel, guard fingers pivotally secured at one of their ends on each side of the trolley wheel, pivoted cylinders arranged on each side of the wheel, spring pressed rods reciprocably mounted in the cylinders, and means pivotally connecting the upper ends of the rods to the guard fingers.

5. In a guide for trolley harps, the combination with a semi-cylindrical casing, a shaft rotatably carried by the casing, a trolley wheel mounted within the casing and carried by said shaft, arcuate guard fingers arranged on opposite sides of the trolley wheel, means hingedly connecting the inner ends of the fingers to the casings, hinged cylinders carried by the casing, pistons in the cylinders, means for urging the pistons to a raised position, and means hingedly connecting the pistons to the outer ends of the guard fingers.

6. In a guide for trolley harps, the combination with branching or crossing conductor wires, of a guard plate including a centrally disposed flange arranged to receive the wires, outwardly and downwardly curved flanges arranged on opposite sides of the central flange, said arcuately curved flanges forming in connection with the centrally disposed flanges, guard tracks.

7. In a guide for trolley harps, the combination with crossing or branching conductor wires, of a guard plate provided with a central flange for the wires, and arcuate curved guard flanges arranged on opposite sides of the centrally disposed flanges, said arcuate flanges forming guide tracks, the outer ends of said plate being upturned, as and for the purpose specified.

8. In a guide for trolley harps, the combination with crossings and branching conductor wires having guard tracks arranged on opposite sides thereof, of a trolley wheel for engagement with the wires and guard members carried by the wheel for engagement with the guard tracks.

CHARLES F. FALLINE.